United States Patent
Aramendia et al.

(10) Patent No.: US 8,702,195 B2
(45) Date of Patent: Apr. 22, 2014

(54) DETERMINING MISALIGNMENT OF A PRINTHEAD IN A PRINTER

(75) Inventors: Sergio Puigardeu Aramendia, Barcelona (ES); M. Isabel Borrell Bayona, Barcelona Manresa (ES); Ángel Martínez Barambio, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 214 days.

(21) Appl. No.: 13/224,567

(22) Filed: Sep. 2, 2011

(65) Prior Publication Data

US 2013/0057602 A1    Mar. 7, 2013

(51) Int. Cl.
*B41J 29/393*    (2006.01)

(52) U.S. Cl.
USPC .................................... 347/19; 347/5

(58) Field of Classification Search
USPC ............................................ 347/5, 19
See application file for complete search history.

(56) References Cited

U.S. PATENT DOCUMENTS

| | | |
|---|---|---|
| 5,250,956 A | 10/1993 | Haselby |
| 5,262,797 A | 11/1993 | Boeller |
| 5,289,208 A | 2/1994 | Haselby |
| 5,297,017 A | 3/1994 | Haselby |
| 5,448,269 A | 9/1995 | Beauchamp |
| 5,451,990 A * | 9/1995 | Sorenson et al. ............... 347/37 |
| 5,600,350 A | 2/1997 | Cobbs |
| 6,234,602 B1 | 5/2001 | Soto |
| 2003/0016978 A1 * | 1/2003 | Sarmast et al. ................. 400/74 |
| 2003/0067532 A1 * | 4/2003 | Beaufort ...................... 347/240 |
| 2006/0044577 A1 * | 3/2006 | Weast et al. .................... 358/1.9 |
| 2010/0013882 A1 * | 1/2010 | Mizes et al. .................... 347/14 |

* cited by examiner

*Primary Examiner* — Julian Huffman
*Assistant Examiner* — Sharon A Polk

(57) ABSTRACT

A barcode on a medium is received. It is determined whether misalignment of a printhead of the printer is present based on bars in the barcode.

12 Claims, 2 Drawing Sheets

DETERMINING MISALIGNMENT OF A PRINTHEAD IN A PRINTER

BACKGROUND

A printer includes a printhead for printing information (e.g. text, images, etc.) onto a medium, such as paper, a transparency, and so forth. If misalignment of the printhead is present, then printing performance can suffer.

BRIEF DESCRIPTION OF THE DRAWINGS

Some implementations are described with respect to the following figures.

DETAILED DESCRIPTION

Figure 1:
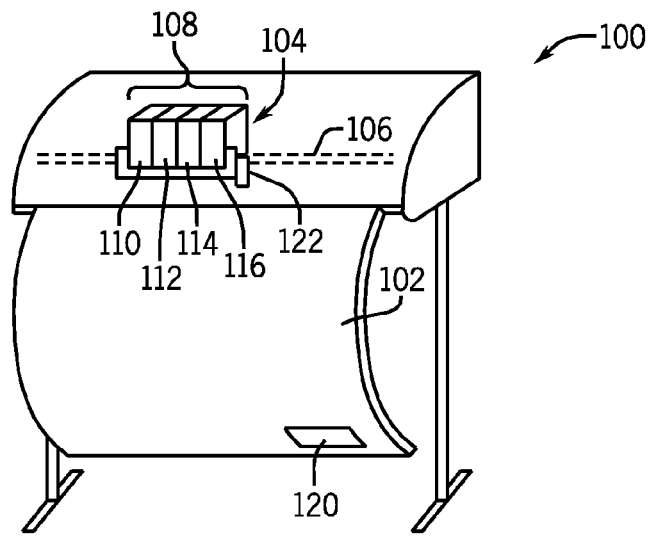
FIG. 1 is a schematic diagram of an example printer that incorporates some implementations.

Over the life of a printer, print quality defects can occur due to misalignment of a printhead in the printer with respect to the medium on which information (e.g. text, images, etc.) is to be printed. A "printhead" refers to an assembly in a printer used to deliver ink or other print material to allow for printing of information on a medium (e.g. paper, transparency, etc.). In some implementations where a printer uses ink droplets (delivered from a printhead) to print information on a medium, the misalignment of the printhead can result in mis-positioning of ink droplets on the medium. Printers that employ ink droplets for printing are often referred to as inkjet printers. In the ensuing discussion, although reference is made to printer technologies that employ ink droplets, it is noted that techniques or mechanisms according to some implementations can also be applied to other types of printers that employ other printing technologies.

"Printhead misalignment" refers to any alignment issue in a printer in which information printed on a medium is at a position that is out of alignment with respect to an expected position by greater than some predefined threshold. Printhead misalignment can be caused by the various sources, including carriage positioning errors (where a carriage is used to carry the printhead), medium-positioning errors, or other sources. As examples, printhead misalignment can result in mis-positioning of ink droplets, resulting in dot placement error (dpe). Note that in a color printer, there can be ink droplets of multiple colors. In other examples, ink droplets can be of just one color (e.g. black).

Typically, to avoid print quality defects, printhead alignment procedures can be performed. However, printhead alignment procedures can be complex and can consume a substantial amount of ink, media, and time; as a result, many customers may not be willing to perform printhead alignment procedures.

In accordance with some implementations, relatively convenient techniques or mechanisms are provided to detect printhead misalignment in a printer, such that correction of this printhead misalignment can be performed. To allow for convenient detection of printhead misalignment, a barcode printed on a medium (e.g. paper, transparency, or other type of medium) is read by the printer, and the barcode is used for determining whether printhead misalignment is present. A "barcode" refers to a pattern that includes an identifier of a medium on which the pattern is printed. In some implementations, the identifier in the barcode is a unique identifier that uniquely identifies a particular medium—in other words, barcodes on different media contain different identifiers of the respective media. For example, the barcode printed on a first medium contains a first identifier that uniquely identifies the first medium, while the barcode printed onto a second medium contains a second identifier that uniquely identifies the second medium, where the second identifier is different from the first identifier.

In some examples, the identifier contained in the barcode can also be used by a printer to identify a type of the medium (e.g. white paper, glossy paper, color paper, paper of a certain width, etc.). The barcode can be printed by a printer on a medium in response to activation of a barcode-printing option on the printer (such as by a user activating the option on a control panel of the printer). In such examples, when the barcode-printing option is activated, the printer can print the barcode at a predetermined location on the medium upon loading or unloading of the medium at the printer. In this manner, after the barcode has been printed, the printer can read the barcode the next time the medium is loaded, to identify the medium. In other examples, other triggers for printing barcodes on media can be employed, such as in response to the printer detecting that a barcode does not exist at the predetermined location of the medium.

In further examples, in scenarios where the medium is in the form of a roll, the printer can use the barcode to record a length of a medium that remains available for printing. In such scenarios, after performing printing on some portion of the roll, the printer can determine the remaining length of the roll that is available, and can record such remaining length with the barcode of the roll for use the next time the roll is loaded in the printer.

In accordance with some implementations, by employing the barcode feature printed on a medium to perform printhead misalignment, a separate test alignment pattern (other than the barcode) does not have to be printed on the medium.

FIG. 1 illustrates an example printer 100 for printing information onto a medium 102. In examples according to FIG. 1, the medium 102 includes a roll of paper that is unrolled as the printer 100 prints information on the paper. In other examples, the medium 102 does not have to be in the form of a roll—rather, the medium can include a sheet having predefined dimensions, such as dimensions according to a letter size, legal size, A4 size, and so forth. Also, instead of paper, the medium 102 can be of another type, such as a transparency or other type of medium.

The printer 100 includes a carriage assembly 104 that is movable laterally along a carriage bar 106. The carriage assembly 104 includes a printhead 108 for delivering ink droplets for printing information on the medium 102. The printhead 108 can include multiple inkjet cartridges (also referred to as "inkjet pens") 110, 112, 114, and 116, that store respective inks of different colors (e.g. black, yellow, magenta, and cyan). During operation, the inkjet cartridges output ink droplets onto the medium 102. In other examples, the printhead 108 can include inkjet cartridge(s) having ink of a single color (e.g. black).

In other implementations, instead of using inkjet cartridges, the printer 100 can use different types of printheads for printing onto the medium 102.

As shown in FIG. 1, a barcode 120 is printed on a portion of the medium 102. In some examples, the barcode 120 includes an identifier that uniquely identifies the medium 102. The printer 100 is able to print onto multiple different media (e.g. multiple rolls of paper). Each medium can be uniquely identified with a different barcode.

The barcode 120 printed onto the medium 102 can be optically scanned by an optical detector 122. In examples according to FIG. 1, the optical detector 122 is mounted to the carriage assembly 104—in other examples, the optical detector 122 can be attached to another part of the printer 100. An output generated by the optical detector 122 based on reading the barcode is provided to a printer controller (discussed further below) to determine whether printhead misalignment is present, and if so, to perform appropriate correction.

Figure 2A:
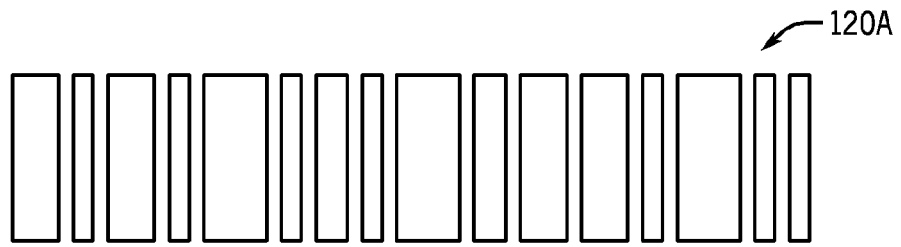
FIGS. 2A-2B illustrate barcodes usable for detecting misalignment of a printhead of a printer, in accordance with some implementations.
Figure 2B:
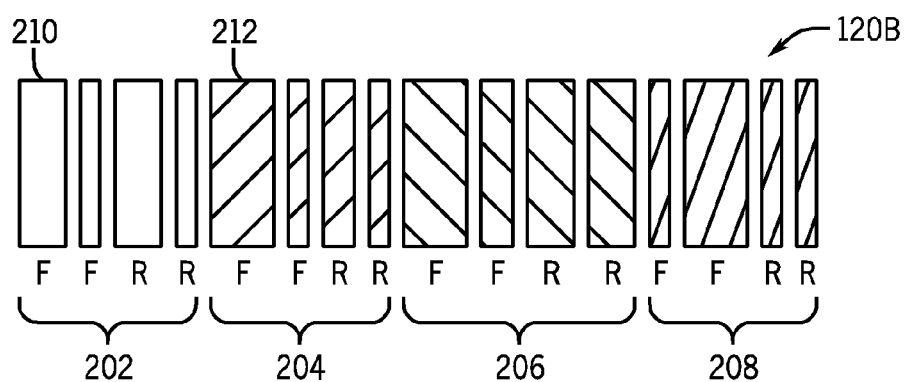

FIGS. 2A-2B illustrate example barcodes 120A, 120B, respectively. The barcode 120A of FIG. 2A has vertical bars that are all printed in black ink. The combination of the bars of the barcode 120A provides a unique identifier of the respective medium on which the barcode 120A is printed. In some examples, it is possible to perform detection of printhead misalignment using the bars of the barcode 120A.

FIG. 2B shows the barcode 120B that differs from the barcode 120A. The barcode 120B has vertical bars with different colors. The barcode 120B has four different subsets of bars according to respective different colors. As examples, a first subset 202 of vertical bars is printed with black ink, a second subset 204 of vertical bars is printed with cyan ink, a third subset 206 of vertical bars is printed with magenta ink, and a fourth subset 208 of vertical bars is printed with yellow ink. In other examples, different colors can be used for printing the vertical bars of the barcode 120B.

Although reference has been made to barcodes with vertical bars, it is noted that in different implementations, barcodes can include horizontal bars, or diagonal bars.

In FIG. 2B, vertical bars associated with the "F" indication refers to vertical bars printed when the carriage assembly 104 of FIG. 1 moves in a first direction (forward carriage direction), while vertical bars associated with the "R" indication indicates that the vertical bars were printed with the carriage assembly 104 moving in a second, opposite direction (reverse carriage direction).

In examples according to FIG. 2B, the barcode 120B has four bars of each color. Two of the bars of each color are printed in the forward carriage direction, while the other two bars are printed in the reverse carriage direction. This allows an alignment procedure to detect and correct alignment issues among colors (e.g. color-to-color dpe) and between forward and reverse printing directions (e.g. bidirectional dpe).

Color-to-color dpe (dot placement error) is detected by measuring offsets (distances) between bars of different colors, and comparing such measured offsets to expected offsets (which can be pre-stored in a storage medium of the printer 100). Any differences between measured offsets and expected offsets provide indications of printhead misalignment. For example, the offset between a bar 210 (of black ink) and a bar 212 (of cyan ink) can be measured (by taking the difference between a measured position of the bar 210 and a measured position of the bar 212), and this measured offset can be compared to an expected offset to determine if color-to-color dpe is present. Alternatively, multiple offsets can be measured, where each of the multiple offsets is between a bar of a first color and a bar of a second color. The multiple offsets can then be aggregated (e.g. averaged) and compared to an aggregate (e.g. average) of expected offsets for detecting possible color-to-color dpe.

Bidirectional dpe can be based on measuring an offset between a bar printed in the forward carriage direction (F bar), and a bar printed in the reverse carriage direction (R bar). This measured offset is compared to an expected offset, from which bidirectional dpe can be detected. Alternatively, multiple offsets can be measured, where each offset is between an F bar and an R bar—these offsets can be aggregated (e.g. averaged) and the aggregate offset is compared to an aggregate expected offset for detecting bidirectional dpe.

In addition to measuring offsets between or among bars of the barcode, other techniques can also measure widths of the bars of the barcode, where the measured widths can be compared to expected widths (pre-stored in the printer 100) for determining whether differences are present that are indicative of printhead misalignment.

Bidirectional dpe and color-to-color dpe are common sources of dpe that can be compensated during printhead alignment. In other examples, other types of dpe or other printhead misalignments can be detected and corrected for.

Figure 3:
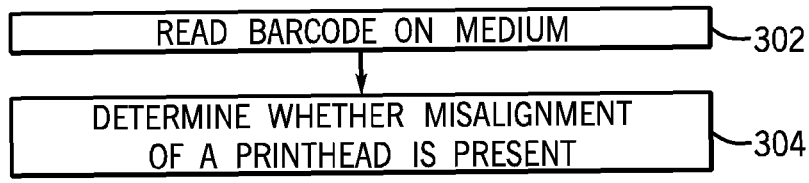
FIGS. 3 and 4 are flow diagrams of processes of detecting misalignment of a printhead in a printer, according to some implementations.

FIG. 3 is a flow diagram of a process according to some implementations. The process can be performed by a printer controller in the printer 100, where the printer controller can be implemented as a processor or other type of hardware control module. In some implementations, the printer controller can be a hardware-specific implementation. In other implementations, the printer controller can include machine-readable instructions (e.g. software or firmware) executing in a hardware control module to perform the alignment procedure.

The process of FIG. 3 reads (at 302) a barcode on a medium. The process then determines (at 304) whether misalignment of a printhead of the printer is present based on reading bars in the barcode. As examples, the detected printhead misalignment can include a color-to-color dpe, bidirectional dpe, or other type of printhead misalignment.

Figure 4:
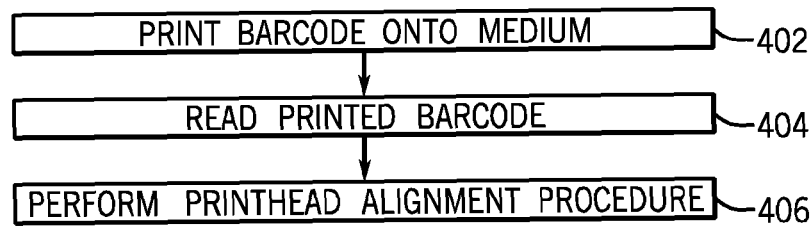

FIG. 4 is a flow diagram of a process according to further implementations, which can also be performed by a printer controller. The process causes the printer 100 to print (at 402) a barcode onto a medium. Subsequently, the process reads (at 404) the printed barcode printed on the medium.

The process uses the read barcode to perform (at 406) an alignment procedure. The alignment procedure includes detecting printhead misalignment based on the bars of the barcode. If printhead misalignment is detected, then the alignment procedure performs printhead alignment, such as by mechanically adjusting positions or a speed of the carriage assembly 104 in FIG. 1.

Using techniques or mechanisms according to some implementations, convenient printhead misalignment detection can be performed. The printhead misalignment detection can be performed transparently to users, with the printhead misalignment detection triggered in response to predefined events.

Figure 5:
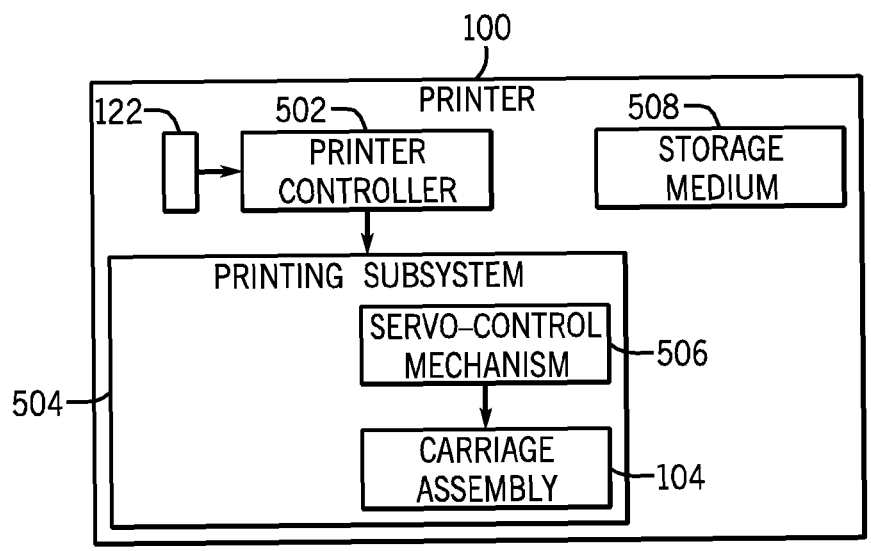
FIG. 5 is a block diagram of a printer that includes a printer controller and a printing subsystem, according to some implementations.

FIG. 5 is a block diagram of the example printer 100 that includes a printer controller 502 and a printing subsystem 504. The printing subsystem 504 can include the carriage assembly 104, whose position and movement are controlled by a servo-control mechanism 506. The servo-control mechanism 506 is controlled based on control signals from the printer controller 502.

The printer controller 502 can perform the process of FIG. 3 or 4, as discussed above. As shown in FIG. 5, the printer controller 502 receives the output of the optical detector 122, where the output can include a representation of a barcode printed on a medium as scanned by the optical detector 122. The printer 100 further includes a storage medium 508 to store information. The stored information can include expected offsets and/or widths (as discussed above) that can be compared to respective measured offsets and/or widths for determining whether printhead misalignment is present.

In some implementations where machine-readable instructions are executed by the printer controller 502, such machine-readable instructions can be initially stored in the storage medium 508 and loaded for execution. In such implementations, the printer controller 502 can include a processor for executing the machine-readable instructions. A processor can include a microprocessor, microcontroller, processor module or subsystem, programmable integrated circuit, programmable gate array, or another control or computing device.

The storage medium 508 can be as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
reading, by a printer, a first barcode on a first medium, where the first barcode contains an identifier of the first medium;
determining, by the printer, whether misalignment of a printhead of the printer is present based on reading bars in the first barcode;
printing, by the printhead, a second barcode on a second medium, wherein the second barcode is different from the first barcode and contains an identifier of the second medium;
reading the second barcode from the second medium; and
determining, by the printer, whether misalignment of the printhead is present based on reading bars of the second barcode.

2. The method of claim 1, wherein determining whether misalignment of the printhead of the printer is present based on reading the bars of the first barcode comprises measuring offsets between the bars of the first barcode and comparing the measured offsets to predefined offsets.

3. The method of claim 1, wherein determining whether misalignment of the printhead is present based on reading the bars of the first barcode comprises measuring widths of the bars of the first barcode and comparing the measured widths to predefined widths.

4. The method of claim 1, wherein the printhead has ink cartridges to output ink droplets onto each of the first medium and the second medium.

5. A method comprising:
reading, by a printer, a barcode on a medium, where the barcode contains an identifier of the medium; and
determining, by the printer, whether misalignment of a printhead of the printer is present based on reading bars in the barcode,
wherein reading the barcode comprises reading the barcode that has a first subset of the bars printed on the medium as the printhead moved in a first direction, and a second subset of the bars printed on the medium as the printhead moved in a second, opposite direction.

6. The method of claim 5, further comprising:
printing, by the printhead, the barcode on the medium.

7. The method of claim 6, wherein the printing is performed a first time that the medium is loaded in the printer.

8. The method of claim 5, wherein the reading and determining are triggered by loading of the medium in the printer, if the barcode was previously printed on the medium.

9. The method of claim 5, wherein the medium includes a roll of the medium that is unrolled by the printer to print information on the medium.

10. A method comprising:
printing, by a printhead of a printer, a barcode on a medium, wherein the printing is performed a first time that the medium is loaded in the printer;
reading, by the printer, the barcode on the medium, where the barcode contains an identifier of the medium;
determining, by the printer, whether misalignment of the printhead of the printer is present based on reading bars in the barcode;
wherein the reading and determining are triggered by either of:
unloading of the medium from the printer, or
loading of the medium in the printer, if the barcode was previously printed on the medium.

11. The method of claim 10, wherein reading the barcode comprises reading the barcode that has a first subset of the bars and a second subset of the bars, where the bars in the first subset are according to a first color, and where the bars in the second subset are according to a second color.

12. An article comprising at least one non-transitory machine-readable storage medium storing instructions that upon execution cause a printer controller in a printer to:
receive a representation of a barcode on a medium, where the barcode contains an identifier of the medium; and
determine whether misalignment of a printhead of the printer is present based on reading bars in the barcode, wherein the bars in the barcode include plural subsets of bars according to respective different colors, wherein each of the plural subsets includes bars printed with the printhead moving in a first direction, and bars printed with the printhead moving in a second, opposite direction.

* * * * *